United States Patent [19]
Roth

[11] Patent Number: 6,108,482
[45] Date of Patent: Aug. 22, 2000

[54] FIBER OPTIC CONNECTOR RECEPTACLE

[75] Inventor: Richard F. Roth, Downers Grove, Ill.

[73] Assignee: Molex Incorporated, Lisle, Ill.

[21] Appl. No.: 09/006,707

[22] Filed: Jan. 14, 1998

[51] Int. Cl.[7] .................................................. G02B 6/38
[52] U.S. Cl. ............................................. 385/139; 385/60
[58] Field of Search ............................... 385/76, 78, 139, 385/60

[56] References Cited

U.S. PATENT DOCUMENTS

| | | | |
|---|---|---|---|
| 4,712,861 | 12/1987 | Lukas et al. | 350/96.21 |
| 4,779,950 | 10/1988 | Williams | 350/96.21 |
| 5,104,242 | 4/1992 | Ishikawa | 385/53 |
| 5,202,949 | 4/1993 | Hileman et al. | 385/134 |
| 5,363,460 | 11/1994 | Marazzi et al. | 385/70 |
| 5,436,987 | 7/1995 | Saito et al. | 385/16 |
| 5,506,922 | 4/1996 | Grois et al. | 385/75 |
| 5,570,445 | 10/1996 | Chou et al. | 385/92 |
| 5,708,745 | 1/1998 | Yamaji et al. | 385/92 |
| 5,845,036 | 12/1998 | De Marchi | 385/139 |

*Primary Examiner*—Hung N. Ngo
*Attorney, Agent, or Firm*—A. A. Tirva

[57] ABSTRACT

A receptacle is provided for receiving a fiber optic connector along an optic axis, the connector including a mating end that terminates an end of an optical fiber. The receptacle includes a housing having an open end for receiving the mating end of the fiber optic connector inserted thereinto on the optic axis. A shutter is mounted on the housing for movement to close and open the open end. The shutter extends across the optic axis when the shutter is closed. The shutter is movable away from the optic axis upon engagement by the inserted mating end of the connector. The shutter includes an outer surface having a recessed area for registry with the terminated end of the optical fiber to protect the fiber end.

8 Claims, 3 Drawing Sheets

FIBER OPTIC CONNECTOR RECEPTACLE

FIELD OF THE INVENTION

This invention generally relates to the art of fiber optic connectors and, particularly, to a receptacle, such as an adapter, for receiving a fiber optic connector at one or both ends of the adapter.

BACKGROUND OF THE INVENTION

Fiber optic connectors of a wide variety of designs have been employed to terminate optical fiber cables and to facilitate connection of the cables to other cables or other optical fiber transmission devices. A typical optic fiber connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

Various problems are encountered when terminating optical fibers in fiber optic connectors versus terminating electrical conductors in electrical connectors, when situations arise wherein a fiber end of an "active" fiber optic connector is exposed. A typical situation might arise when one of the fiber optic connectors at one end of an adapter is removed, leaving the other "active" fiber optic connector in the adapter.

In particular, an exposed fiber end may be damaged by adverse environmental hazards, and the accumulation of dust and dirt may impair the optical transmission capabilities of the fiber. Another very important problem is to protect an operator's eyes from dangerous light beams from the exposed end of an active optical fiber. For instance, an operator's eyes may be damaged from dangerous light beams exiting an unprotected receptacle or adapter.

Heretofore, dust covers, end caps or spring-loaded shutters have been used to close an open end of an adapter to, thereby, cover the exposed fiber ends to protect the fiber ends from adverse environmental hazards and to prevent light energy from the fiber ends from exiting the adapter. One such spring-loaded shutter is pivotally mounted on the adapter adjacent the open end thereof and is pivotally movable to close and open the open end. The shutter member extends across the optic axis of the connector/adapter assembly when the shutter member is closed. The shutter member is pivotable away from the optic axis to its open condition upon engagement by the inserted fiber optic connector.

One of the problems with opening protective shutters by engagement with the inserted end of the fiber optic connector, is that the ferrule and/or the end of the optical fiber terminated by the ferrule can be damaged by engaging and opening the shutter. For instance, the ferrule and/or fiber end of the connector may be highly polished. If the ferrule end is jammed against the shutter to move the shutter to its open position, the ferrule and/or fiber end can become contaminated, scratched or even broken. The present invention is directed to solving this problem in a fiber optic receptacle having a shutter automatically openable by engagement with an inserted connector.

SUMMARY OF THE INVENTION

An object, therefore, of the invention is to provide a new and improved receptacle, such as an adapter, for receiving a fiber optic connector along an optic axis. For instance, the fiber optic connector may be of the type which has a forwardly projecting ferrule terminating one or more optical fibers.

In the exemplary embodiment of the invention, the receptacle includes a housing having an open end for receiving the fiber optic connector inserted thereinto on the optic axis. A shutter member is pivotally mounted on the housing adjacent the open end and is pivotally movable to close and open the open end. The shutter member extends across the optic axis when the shutter member is closed. The shutter member is pivotable away from the optic axis upon engagement by the inserted fiber optic connector. The shutter member includes an outer connector-engaging surface having a recessed area for receiving the forward projecting ferrule of the connector or at least the area of the terminated fiber ends.

As disclosed herein, the shutter member and the recessed area are generally rectangular. The outer connector-engaging surface is stepped to define a radially outwardly facing ledge about at least a top portion of the recessed area. The recessed area is provided with a depth slightly less than the distance the ferrule projects from the fiber optic connector, or at least deep enough to prevent contamination or damage of the terminated fiber ends.

It should be understood that the invention is not limited to use with fiber optic connectors which have forwardly projecting ferrules. The invention contemplates providing a recessed area on a shutter member which is registrable with the fiber end or ends of any type of connector, whereby the recessed area protects the fiber ends against engagement with the shutter member.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 5:
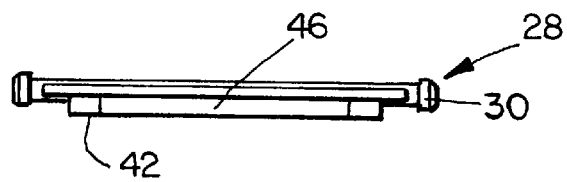
FIG. 5 is a top plan view of the shutter member.
Figure 6:
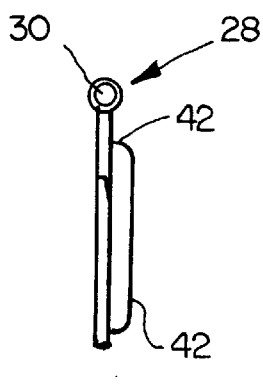
FIG. 6 is a side elevational view of the shutter member.
Figure 4:
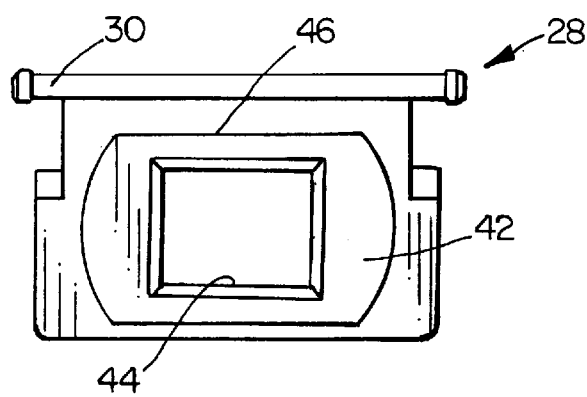
FIG. 4 is a front elevational view of the shutter member.
Figure 7:
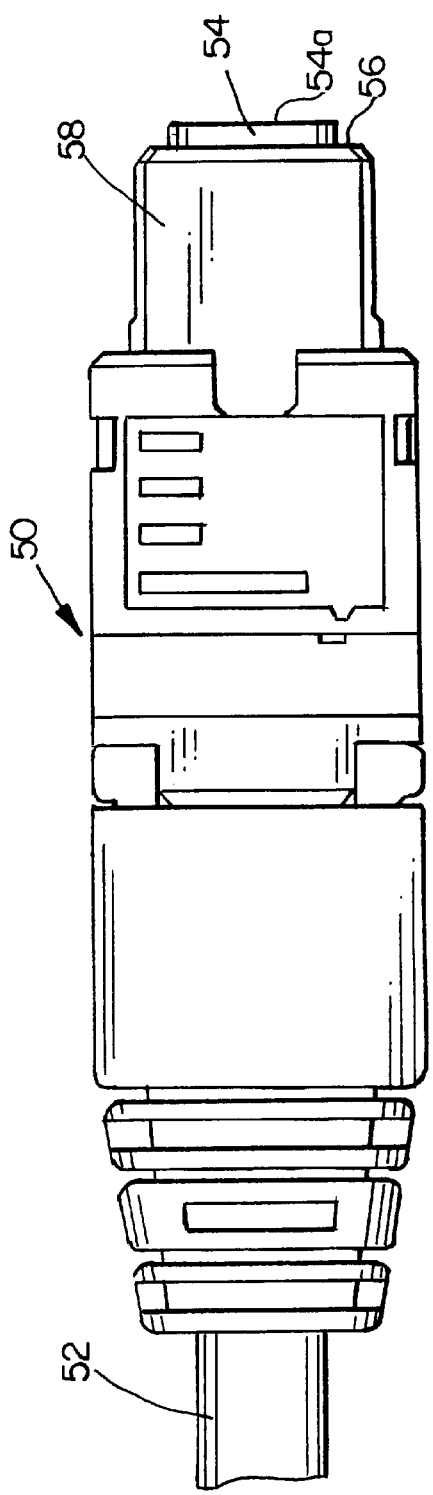
FIG. 7 is a top plan view of one type of fiber optic connector mateable with the adapter.
Figure 8:
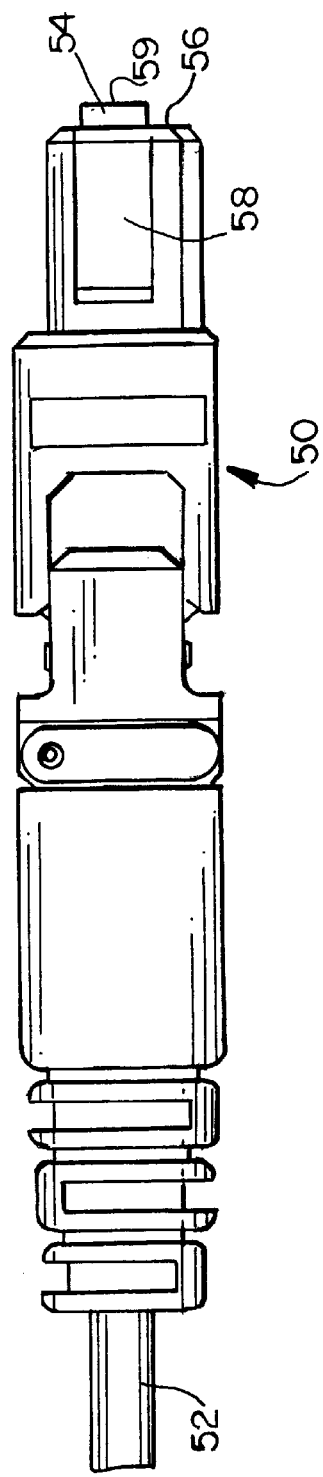
FIG. 8 is a side elevational view of the fiber optic connector.

Generally, the invention is applicable for use in a receptacle for receiving a fiber optic connector. The connector may be of the type which has a forwardly projecting ferrule as shown in FIGS. 7 and 8 and described hereinafter. The receptacle may be in the form of an adapter assembly, generally designated 12 in FIGS. 1 and 2 which includes a novel shutter member shown in FIGS. 4–6.

Figure 1:
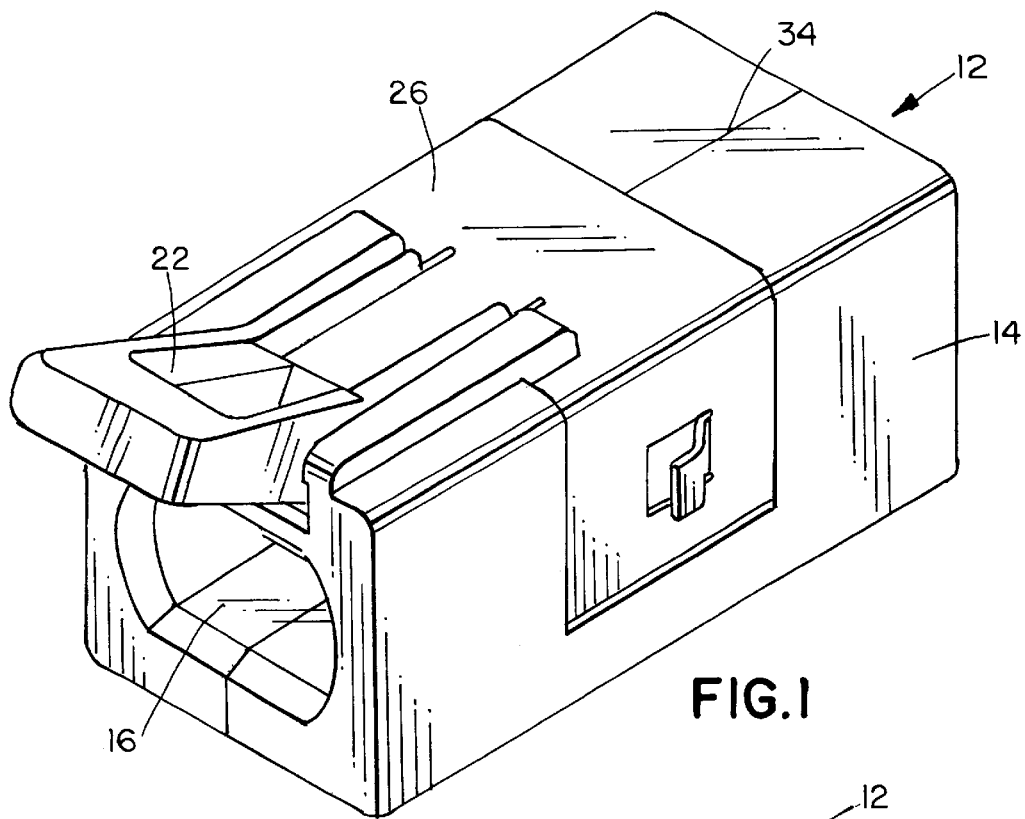
FIG. 1 is a perspective view of an adapter-type receptacle with which the invention is applicable.
Figure 2:
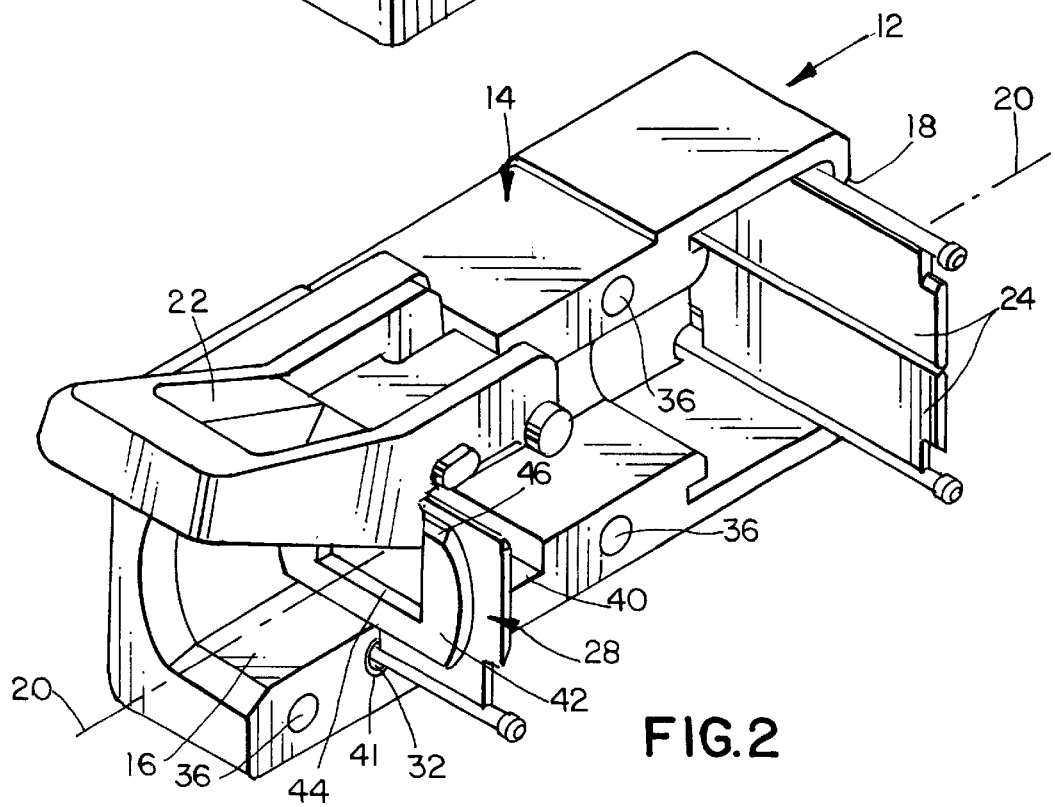
FIG. 2 is a perspective view of the receptacle, cut away to show the shutter member.
Figure 3:
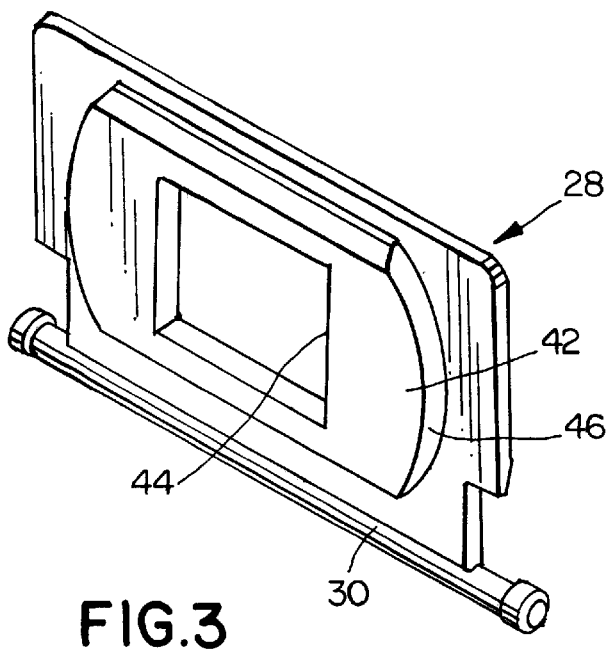
FIG. 3 is a perspective view of the shutter member, alone.

More particularly and referring first to FIGS. 1 and 2, adapter 12 includes a housing, generally designated 14, which has a first, open receptacle end 16 and a second, open receptacle end 18 which define an optic axis 20 extending axially though the adapter. Electrical connectors may be inserted into open ends 16 and 18, whereby the connectors mate within and are held in mating engagement by adapter 12. A latch 22 is provided on the housing for latching engagement with the fiber optic connector adapted for insertion into open receptacle end 16. A pair of shutter doors 24 close and open receptacle end 18 in response to insertion thereinto of a second fiber optic connector (not shown). A metal shell 26 (FIG. 1) surrounds at least a portion of housing 14 and is operatively associated with latch 22.

Referring to FIGS. 3–6 in conjunction with FIGS. 1 and 2, the invention is embodied in a door or shutter, generally designated 28, which is a one-piece structure that may be molded of plastic material. The shutter includes a pivot rod portion 30 integral therewith. The pivot rod portion is journalled in a bore 32 (FIG. 2) in housing 14. In order to provide for assembly of the shutter (as well as latch 22 and shutters 24), the housing is fabricated in two parts joined at an interface 34 (FIG. 1). One part may have appropriate holes 36 for receiving pegs from the other part with a press-fit to provide an interference or frictional securement between the parts.

Shutter 28 is pivotally mounted within housing 14 by pivot rod portion 30 for pivotal movement to close and open receptacle end 16 of the adapter. The shutter extends across optical axis 20 as shown in FIG. 2 when the shutter is closed. The shutter pivots away from the optic axis and into a recessed area 40 of the housing upon engagement by the fiber optic connector inserted into receptacle end 16. A torsion spring 41 is operatively associated between shutter 28 and housing 14 to bias the shutter back to its closed position (FIG. 2) when the fiber optic connector is removed from open receptacle end 16.

The invention contemplates that shutter 28 include an outer connector-engaging surface 42 having a recessed area 44 for receiving a forwardly projecting ferrule of the connector inserted into receptacle end 16. In essence, surface 42 may engage the front face of the ferrule, and recessed area 44 is located opposite the region where the optical fibers are terminated. Therefore, recessed area 44 should be designed with a depth slightly less than the distance the ferrule projects from the fiber optic connector or at least deep enough to protect the terminated ends of the optical fibers, as described hereinafter.

Another feature of the invention is that connector-engaging surface 42 is stepped to define a radially outwardly facing ledge 46 spaced from and substantially surrounding recessed area 44. Since shutter 28 is used, in part, as a dust cover, at least the top of ledge 46 has been found to provide a dust accumulation area which minimizes the amount of dust which migrates into recessed area 44 where the fiber ends of the fiber optic connector are located.

FIGS. 7 and 8 show one type of fiber optic connector, generally designated 50, which might be used with receptacles incorporating the invention. Connector 50 terminates a fiber optic cable 52 which has stripped fiber ends (not shown) held within a ferrule 54 that projects forwardly of a front mating face 56 of a forward mating end 58 of the connector. The fiber ends are exposed at a front face 54a of the ferrule. Of course, it should be understood that a wide variety of fiber optic connectors are readily applicable for use with the invention.

With that understanding, it can be understood that mating end 58 of connector 50 can be inserted into open receptacle end 16 of adapter 12. Front mating face 54a of the ferrule engages outer surface 42 of shutter 28 and automatically opens the shutter (i.e. pivots the shutter away from optic axis 20). During the insertion of connector 50, the fiber containing region of ferrule 54 is located opposite recessed area 44 of the shutter and thus does not engage surface 42 of the shutter. Recessed area 44 has a depth such that the polished ends of the optical fibers are protected from contamination or damage. The polished fiber ends at the front face 54a of the ferrule never come into contact with any portions of shutter 28 during mating of the connector into receptacle 12 and automatically opening the shutter.

As stated in the "Summary", above, the invention is not limited to fiber optic connectors which have forwardly projecting ferrules, such as ferrule 54 in connector 50 as shown in FIGS. 7 and 8. Providing the recessed area in the shutter or door of a receptacle will protect any structure, including the polished ends of the fibers, themselves, as long as the recessed area is in axial registry with the fiber ends. The recessed area will prevent the fiber ends from engaging any portion of the shutter which might damage or break the fiber ends.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A receptacle for receiving a fiber optic connector along an optic axis, the fiber optic connector being of the type which has a forwardly projecting ferrule, comprising:

a housing having an open end for receiving the fiber optic connector inserted thereinto on said optic axis; and a shutter member pivotally mounted on the housing adjacent to said open end and being pivotally movable to close and open said open end, the shutter member extending across the optic axis when the shutter member is closed, the shutter member being pivotable inwardly away from the optic axis upon engagement by the inserted fiber optic connector, and the shutter member including an outer connector-engaging surface engageable by the connector to pivot the shutter member inwardly, the connector-engaging surface having a recessed area for receiving the forwardly projecting ferrule of the connector.

2. The receptacle of claim 1 wherein said shutter member is generally rectangular.

3. The receptacle of claim 2 wherein said recessed area is generally rectangular.

4. The receptacle of claim 1 wherein said outer surface is stepped to define a radially outwardly facing ledge about at least a top portion of said recessed area.

5. The receptacle of claim 1 wherein said recessed area is provided with a depth slightly less than the distance the ferrule projects from the fiber optic connector.

6. A receptacle for receiving a fiber optic connector along an optic axis, the connector including a mating end that terminates an end of an optical fiber, comprising:

a housing having an open end for receiving the mating end of the fiber optic connector inserted therein on said optic axis; and a shutter member mounted on the housing for movement to close and open said open end, the shutter member extending across the optic axis when the shutter member is closed, the shutter member being movable inwardly away from the optic axis upon engagement by the inserted mating end of the connector, and the shutter member including an outer connector-engaging surface engageable by the connector to pivot the shutter member inwardly, the connector-engaging surface having a recessed area for registry with the terminated end of the optical fiber to protect the fiber end.

7. The receptacle of claim 6 wherein said shutter member is generally rectangular.

8. The receptacle of claim 6 wherein said outer surface is stepped to define a radially outwardly facing ledge about at least a top portion of said recessed area.

* * * * *